Sept. 12, 1967  S. V. LEONARDO  3,341,161
TRIPOD STAND
Filed Oct. 14, 1965
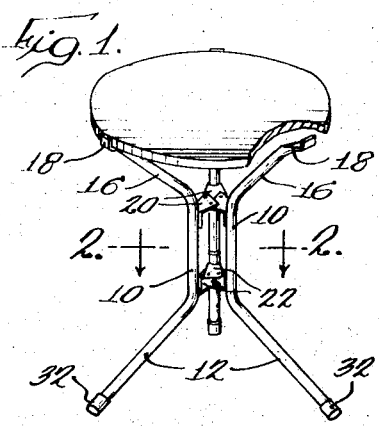
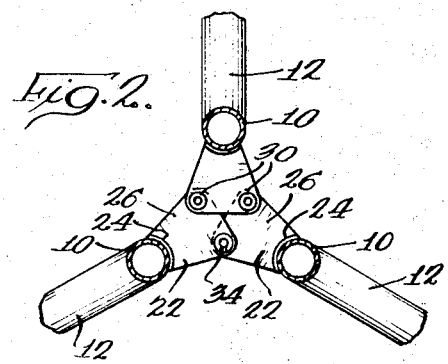
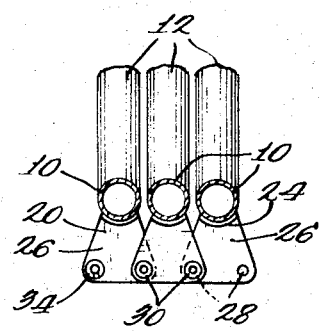
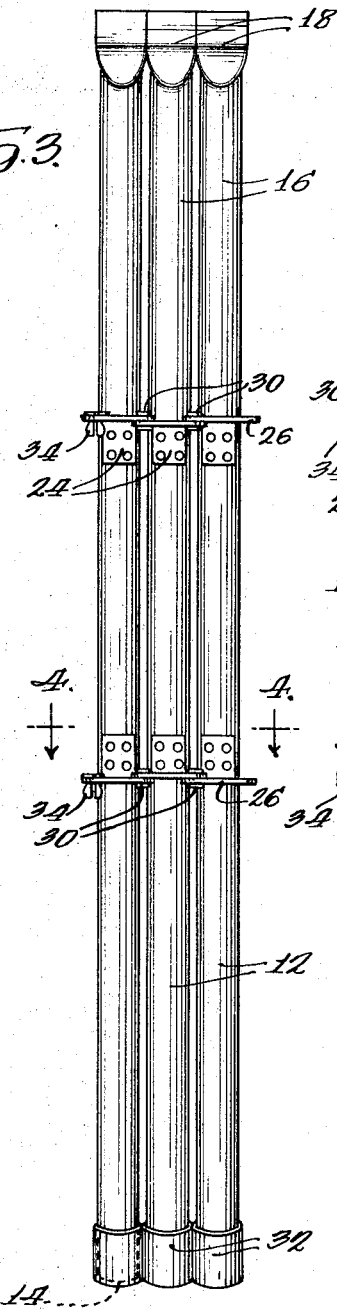
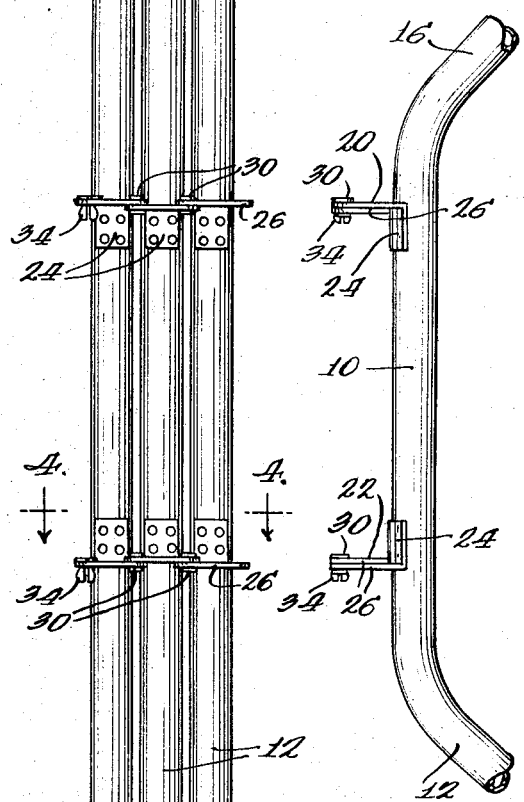
Inventor:
Stephen V. Leonardo
By B. Gordon Allen
Atty

United States Patent Office 3,341,161
Patented Sept. 12, 1967

3,341,161
TRIPOD STAND
Stephen V. Leonardo, 1128 Blanchard,
Downers Grove, Ill. 60515
Filed Oct. 14, 1965, Ser. No. 495,812
2 Claims. (Cl. 248—168)

ABSTRACT OF THE DISCLOSURE

A tripod stand comprised of three legs and hinging structure which connects the legs together so that they can be folded for shipment and assembled by folding into position and inserting a pair of snap fasteners. The structure features an arrangement in which, other than the fasteners, only two basic elements need to be fabricated.

---

It is an object of this invention to provide a novel tripod stand which can be manufactured at minimum cost, and which can be packaged and shipped folded flat and then erected and/or assembled for use with minimum difficulty in a matter of a few seconds.

Yet another object is to provide a novel tripod stand of the type characterized above which requires only two special manufactured parts, plus a few simple, low-cost fastening elements for its construction and assembly.

Other objects and advantages of the invention will become apparent from the following description of a preferred embodiment thereof, which is illustrated in the accompanying drawings.

In the drawings in which similar characters of reference refer to similar parts throughout the several views:

FIG. 1 is a perspective view of a table showing a tripod stand incorporating the invention;

FIG. 2 is a horizontal sectional view which may be considered as taken along the line 2—2 of FIG. 1 looking downwardly as indicated by the arrows;

FIG. 3 is a vertical elevation showing the tripod stand folded flat;

FIG. 4 is a transverse sectional view which may be considered as taken along the line 4—4 of FIG. 3 in the direction indicated by the arrows; and FIG. 5 is a fractional elevational view showing the folded stand as viewed from the side.

Brief summary of invention

The tripod is comprised of three identically shaped tubes which have parallel adjacent portions. These portions are connected together by clips secured, two, to the tube in vertically spaced relation. The clips are identical and the tubes with the clips secured thereto are identical. Each clip has two holes equally spaced from its tube such that the tubes are connected together by fastening elements inserted through aligned holes in the overlapping edge portions of the clips of adjacent tubes.

In order to simplify and reduce the cost of the tripod stand of this invention, the arrangement is such that the three leg elements, which are the principal members of the stand, are identical, and each of these requires the provision of only three separate parts, two of which may be alike.

Referring to the drawings, the primary leg element is a length of steel tubing which is bent to form a substantially straight intermediate section 10 integrally connected to a lower leg portion 12 which is inclined away from the straight portion, so that when the straight portion is vertical relative to a floor, for instance, the lower end 14 of the lower leg portion 12 engages the floor at an appreciable distance away from the point at which the floor is intersected by a line projected downwardly along the axis of the straight portion 10. Above the straight portion 10 the tube is bent outwardly, as at 16, and the upper end 18 thereof may be shaped to embrace the edge of a table top as shown.

The portions 12 and 16 are inclined away from the central section 10 in the same direction, so that the bent tube will lie substantially flat upon a plane surface; that is, all portions of the bent tube are in the same plane.

Near the upper and lower ends of the straight intermediate section 10 the bent tube is provided with upper and lower clips 20 and 22, respectively, which may be identical, and so a description of one will serve as a description of the other. The clip 20 is formed from a piece of sheet metal which is formed generally to provide an L shaped bracket. The downwardly extending leg 24 of this bracket is shaped so as to have a concave cylindrical surface on its outer face which fits the outer surface of the tube section 10. During assembly, this concave surface is placed against the tube wall and these elements are resistance welded together.

The clip or bracket element 20 also provides a flat tab 26 which extends away from the tube section 10 in a direction opposite the outwardly inclined portions 12 and 16. This tab provides a surface in a plane which is normal to the axis of the tube section 10. The tab has two perforations 28 formed therethrough which are equally spaced from the axis of the tube portion 10, and I prefer to space these perforations apart by a distance which is about equal to the diameter of the tube stock of which the leg elements are formed. The reason for this will be explained presently.

The lower clip 22, as stated, may be identical to the clip 20 and is similarly resistance welded to the tube portion 10 in alignment with the clip 20.

A tripod stand, ready for shipment, is made by arranging three of these leg elements in laterally stacked, aligned relationship, such that the adjacent corners of their tabs 20 and 22 overlap, thus bringing into alignment the holes 28 of adjacent leg elements. Rivets 30 are then entered through the aligned holes and set, but not too tightly. The object here is to make sure that the rivets connect the adjacent leg elements, while permitting the leg elements to be hinged about the rivets relative to each other.

If desired, of course, standard rubber or plastics slip-on tips 32 can be secured to the lower ends 14 of the leg elements and the upper ends 18 can be shaped, as shown, for instance, so that a round table top will rest in place and be embraced by the upper leg ends. If desired, such a table top may be triangular or hexagonal, and of course other uses for the stand will also suggest themselves.

It was mentioned above that I prefer to have the holes 28 spaced apart by about the diameter of the tube stock. This promotes flat folding of the three leg elements together for shipment.

In any event, when the stand is to be erected or assembled, it is necessary simply to hinge the leg elements about their rivet connections until the free ends of the tabs of the two side leg elements are overlapped with their holes 28 in alignment. Snap-in split rivets 34 can then be pressed through these aligned holes to complete the assembly. If desired, of course, sheet metal screws or any other suitable fastening device can be substituted for these split rivets.

Since the portion of each tab between its holes 28 forms the equivalent of a stiff bar which is fixed relative to its leg tube, and since these bars when riveted together form equilateral triangles, the structure thus formed is rigid even though none of the rivets is particularly tight. Subassembly at the factory and final assembly by the purchaser is, therefore, facilitated and non-critical.

Note that one of the advantages of this structure is that, other than the rivets, which are common, low-cost, purchasable items, only two elments need to be manufactured. Three bent tubes which are identical, and six clips which are identical, together with the resistance welding step is all of the manufacturing that is required other than setting the rivets to connect the legs together. Furthermore, since the stand can be shipped folded flat, it occupies minimum space and is not easily damaged.

If slip-on tips 32 are used, they may be supplied separately and pressed in place by the user, thus eliminating a manufacturing step and promoting flat folding. As an alternative, the upper ends 18 of the tubes may be shaped to embrace a table top, of for other purpose, in such manner that the width across these shaped portions is appreciably greater than the tube diameter. If so, tips 32 can be fitted which enlarge upon the external tube diameter by the same amount, in which event it is desirable to space the holes 28 apart by this slightly larger dimension, so as to promote flat folding.

From the above description of a preferred embodiment of my invention, it will be apparent that modifications may be made without departing from the scope and spirit of the invention, and, therefore, that the scope of the invention is to be determined from the scope of the following claims.

Having described my invention, what I claim as new and useful and desire to secure by Letters Patent of the United States is:

1. A tripod stand comprising three identical shaped tubes and six identical slightly flexible sheet metal clips, each said clip having a portion secured to a tube and a free standing tab in a plane normal to the axis of its tube, each said tab having a pair of perforations equally spaced from the axis of its tube, said clips being secured to said tubes in spaced pairs for each tube with their tabs parallel and in alignment such that all of said tubes with the clips thereon are identical, the three tubes with the clips thereon being arranged in side by side contiguous relationship with the tab perforations of the center tube in alignment with tab perforations of the outside tubes, fastening elements extending through the aligned perforations to articulate the outside tubes to the center tube, said outside tubes being hinged about said fastening elements to align the remaining tab perforations, and fastening elements extending through the last said perforations to form a rigid tripod structure.

2. The stand called for in claim 1 in which the perforations in each tab are spaced apart by a distance substantially equal to the tube diameter.

References Cited

UNITED STATES PATENTS

| | | | |
|---|---|---|---|
| 1,697,094 | 1/1929 | Turk | 248—167 X |
| 2,026,427 | 12/1935 | Miller | 248—167 X |
| 2,902,325 | 9/1959 | Knoblock | 248—167 |

CHANCELLOR E. HARRIS, *Primary Examiner.*